US006508486B1

(12) United States Patent
Welch et al.

(10) Patent No.: US 6,508,486 B1
(45) Date of Patent: Jan. 21, 2003

(54) DOOR MOUNTED SIDE RESTRAINT

(75) Inventors: Jeffrey A. Welch, Washington Township, MI (US); Douglas S. Weston, Tipp City, OH (US); Madana M. Gopal, Troy, MI (US); Gregg G. Anderson, St. Clair Shores, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/875,718

(22) Filed: Jun. 6, 2001

(51) Int. Cl.⁷ ............................................... B60R 21/22
(52) U.S. Cl. ................ 280/730.2; 280/728.3; 280/743.1; 280/749
(58) Field of Search ............................. 280/730.2, 749, 280/743.1, 728.3, 743.2, 801.1, 808, 807

(56) References Cited

U.S. PATENT DOCUMENTS

| 5,439,247 A | * | 8/1995 | Kolb ........................... 280/729 |
| 5,447,326 A | * | 9/1995 | Laske et al. .............. 280/730.2 |
| 5,865,462 A | * | 2/1999 | Robins et al. ............ 280/730.2 |
| 5,913,536 A | * | 6/1999 | Brown ..................... 280/730.2 |
| 5,938,233 A | | 8/1999 | Specht ..................... 280/730.2 |
| 6,129,377 A | * | 10/2000 | Okumura et al. ........ 280/730.2 |
| 6,168,193 B1 | * | 1/2001 | Shirk et al. .............. 280/730.2 |
| 6,168,194 B1 | * | 1/2001 | Cuevas et al. ........... 280/730.2 |
| 6,276,712 B1 | | 8/2001 | Welch et al. ............. 280/730.2 |

FOREIGN PATENT DOCUMENTS

| JP | 5-139232 | * | 6/1993 | .............. 280/730.2 |

* cited by examiner

*Primary Examiner*—Eric Culbreth
(74) *Attorney, Agent, or Firm*—Kathryn A. Marra

(57) ABSTRACT

A door mounted side restraint system is provided. The door mounted side restraint system includes an air bag module and a retention mechanism. The air bag module includes an inflatable cushion and an inflator in fluid communication with the inflatable cushion. The inflator is activatable to inflate the inflatable cushion. The retention mechanism includes a retention strap and a tensioning device. The retention strap is connected to the inflatable cushion and is deployable across a side window of a vehicle such that a tarp-like effect is provided to the inflatable cushion by the retention strap.

23 Claims, 6 Drawing Sheets

DOOR MOUNTED SIDE RESTRAINT

TECHNICAL FIELD

This application relates generally to restraint systems for vehicles. More specifically, this application relates to a door mounted restraint system.

BACKGROUND

Side air bags and inflatable curtains are installed in the door, pillar and vehicle seats for deployment. The air bag is designed to rapidly deploy or inflate an inflatable cushion.

Air bags are provided in a module having an inflatable cushion and an inflator. The cushion is stored in a folded position within the air bag module. A sensing system determines whether air bag deployment is necessary. The sensing system is either local to or remote of the air bag module and typically includes an accelerometer operatively coupled with a controller. If the sensing system determines that air bag deployment is necessary, it provides a signal to activate the inflator. Upon activation, the inflator provides a supply of inflating gas to the cushion to inflate the cushion. Some inflators are pure gas inflators wherein a pressure vessel contains stored pressurized gas. The pressure vessel communicates with the cushion through various types of rupturable outlets or diaphragms. Other inflators have a gas generator that employs a chemical reaction or combustion, such as the combustion of sodium azide, to produce the volume of gas required to inflate the cushion. Still other inflators are a hybrid of the gas generator and pressure vessel inflators discussed above (hereinafter hybrid inflators). Hybrid inflators include both a pressure vessel and a gas generator. When the gas generator is ignited, the resultant gas flows with the stored gas to the cushion through the pressure vessel outlet.

However, there is a continuing need for improved air bag and restraint systems.

SUMMARY

A restraint system having a door mounted air bag module is provided. The air bag module includes an inflatable cushion having a predetermined shape and an inflator in fluid communication with the inflatable cushion. The inflator is activatable to inflate the inflatable cushion. The predetermined shape has an upper inflatable section, a lower inflatable section, and a recessed portion positioned between the upper and lower inflatable sections.

A door mounted restraint system having a retention mechanism to restrain an occupant in the vehicle is provided. The door mounted retention mechanism includes a retention strap and a tensioning device. The retention strap is connected to an upper rear corner of the side window and is connected to a pulley at a lower front corner of the side window. The tensioning device is connected to the retention strap at the pulley. The tensioning device is activatable to pull slack in the retention strap through the pulley to tighten the retention strap across the side window between the upper rear corner and the lower front corner.

A door mounted side restraint system including an air bag module and a retention mechanism is provided. The air bag module includes an inflatable cushion and an inflator in fluid communication with the inflatable cushion. The inflator is activatable to inflate the inflatable cushion. The retention mechanism includes a retention strap and a tensioning device. The retention strap is connected to the inflatable cushion and is deployable across a side window of a vehicle such that a tarp-like effect is provided to the inflatable cushion by the retention strap.

A door mounted air bag module having a base plate connectable to a door of a vehicle is provided. A trim panel is connected to the base plate by one or more breakaway fasteners such that a cavity is formed between the base plate and the trim panel. An inflatable cushion is stored in the cavity. An inflator in fluid communication with the inflatable cushion is activated to inflate the inflatable cushion. The breakaway fasteners are released by inflation of the inflatable cushion such that the trim panel moves away from the base plate.

The above-described and other features and advantages of the present invention will be appreciated and understood by those skilled in the art from the following detailed description, drawings, and appended claims.

DESCRIPTION OF THE PREFERRED EMBODIMENT

Figure 1:
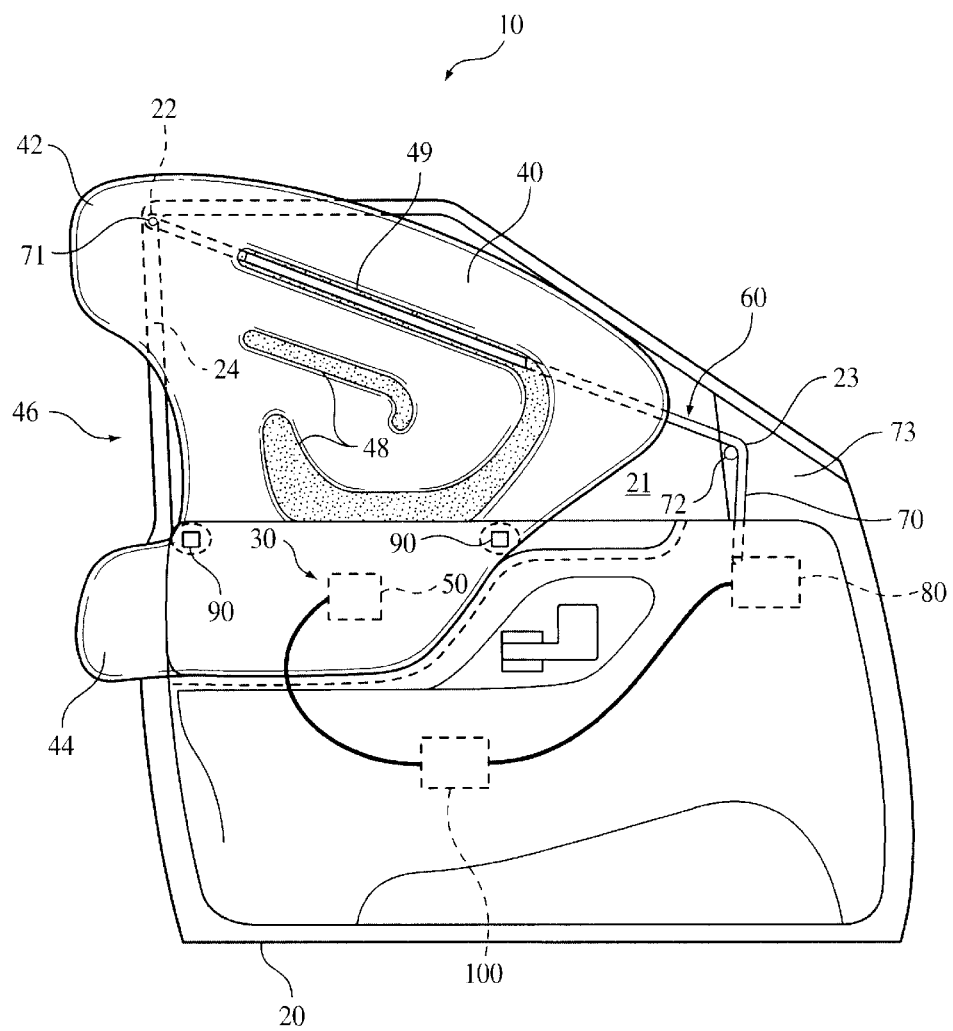
FIG. 1 is a side view of an exemplary embodiment of a door mounted side restraint in a deployed state.

Referring to the Figures and in particular to FIG. 1, a side restraint system 10 is shown in a deployed state. System 10 is adapted to be installed in an undeployed or stored condition in a door 20 of a vehicle (not shown). System 10 includes both an air bag module 30 and a retention mechanism 60. Generally, air bag module 30 includes an inflatable cushion 40 and an inflator 50, while retention mechanism 60 includes a retention strap 70 and a tensioning device 80. Side restraint system 10 provides a tarp-like effect caused by strap 70 suspending cushion 40 in its deployed position across a window or window opening 21 of door 20.

Cushion 40 is made of flexible fabric, such as, but not limited to nylon fabric. Cushion 40 preferably includes a silicone coating to provide the cushion with less porosity, which provides the cushion with the ability to retain its inflated condition for a longer period of time (i.e., increased up time). Cushion 40 is sewn, dielectrically welded, woven, and combinations thereof into the desired shape. Cushion 40 has a shape sufficient to provide upper cushioning and lower cushioning while providing an opening for the vehicle's seat belt.

Cushion 40 includes an upper inflated section 42, a lower inflated section 44, and a recessed portion 46 as illustrated in FIG. 1. Upper inflated section 42 provides upper cushioning, lower inflated section 44 provides lower cushioning, and recessed portion 46 enables cushion 40 to fully deploy such that the recessed portion receives the seat belt. The seat belt is located in recessed portion 46 when cushion 40 is inflated such that both upper and lower portion 42 and 44 are fully inflated.

Also illustrated in FIG. 1, cushion 40 includes one or more sew-out areas 48, which ensure that the cushion radially and laterally inflates in a most expedient manner. Sew-out areas 48 are required when cushion 40 has a two-panel design, namely a front panel connected to a rear panel at its outer edges. Sew-out areas 48 bias the inflation of the cushion 40. However, it is considered within the scope of the present invention for cushion 40 to have other means to bias the inflation of the cushion. For example, tethers (not shown) can be installed inside two-panel cushion 40. Moreover, multi-panel cushions, namely those having a front panel, a rear panel and at least a third panel, are adapted to bias the inflation of the cushion. Accordingly, cushion 40 is described by way of example as including sew-out areas 48, but it is considered within the scope of the present invention for the cushion to have other such biasing devices and designs.

Inflator 50 is adapted to provide a supply of inflating gas to cushion 40 to quickly inflate the cushion. Inflator 50 is operatively coupled with a sensing system 100. Sensing system 100 is adapted to determine whether deployment of cushion 40 is necessary, and if deployment is necessary, the sensing system is adapted to provide an ignition or fire signal to inflator 50. Upon receiving the ignition signal from sensing system 100, inflator 50 provides the inflating gas to cushion 40 from either a pressure vessel containing stored pressurized gas, a chemical reaction, a pyrotechnic combustion, or combinations thereof. In an exemplary embodiment, inflator 50 is a hybrid inflator.

Retention mechanism 60 includes retention strap 70 and tensioning device 80. Tensioning device 80 is operatively coupled with sensing system 100. Sensing system 100 is adapted to determine whether deployment is necessary, and if deployment is necessary, the sensing system is further adapted to provide a tensioning signal to tensioning device 80. Thus during an adverse vehicle condition, retention mechanism 60 deploys strap 70 across window 21.

Preferably, retention mechanism 60 deploys strap 70 across the upper portion of window 21 from an upper rear corner 22 to a lower front corner 23 of door 20. Tensioning device 80 pulls strap 70 taut across window 21. Strap 70 is connected to cushion 40 such that the strap acts to maintain the cushion in position across window 21 regardless of the inflation condition of the cushion. Thus, side restraint system 10 provides the tarp-like effect to cushion 40 by retaining the cushion across window 21 via strap 70. The tarp-like effect is independent of the state of inflation of cushion 40.

Preferably, strap 70 is connected to cushion 40 such that the strap and the cushion slide with respect to one another during deployment. For example, a reinforcing sew-out area 49 is disposed at a diagonal from an upper rear corner 22 of door 20 to a lower front corner 23. Sew-out area 49 is adapted to slidably receive retention strap 70 there through. It should be recognized that other connections, such as a plurality of loops disposed on cushion 40 that receive strap 70, which connect the strap and cushion and allow them to slide with respect to one another during deployment, are included within the scope of the present invention. Strap 70 has a low friction or slippery outer surface to enable the strap to slide through its connection with cushion 40 during deployment. Additionally, strap 70 has a rounded cross-section to reduce binding between the connection of the strap and cushion 40 during deployment. In a preferred embodiment, strap 70 is a woven polyester or nylon cord.

Strap 70 is secured at corner 22 by a pivot connection 71 and secured at corner 23 by a pulley 72. Pivot 71 allows strap 70 to move between a stored-position adjacent a vertical portion 24 of door 20 and a deployed position across window 21. Pulley 72 allows strap 70 to slide with respect to corner 23.

Figure 2:
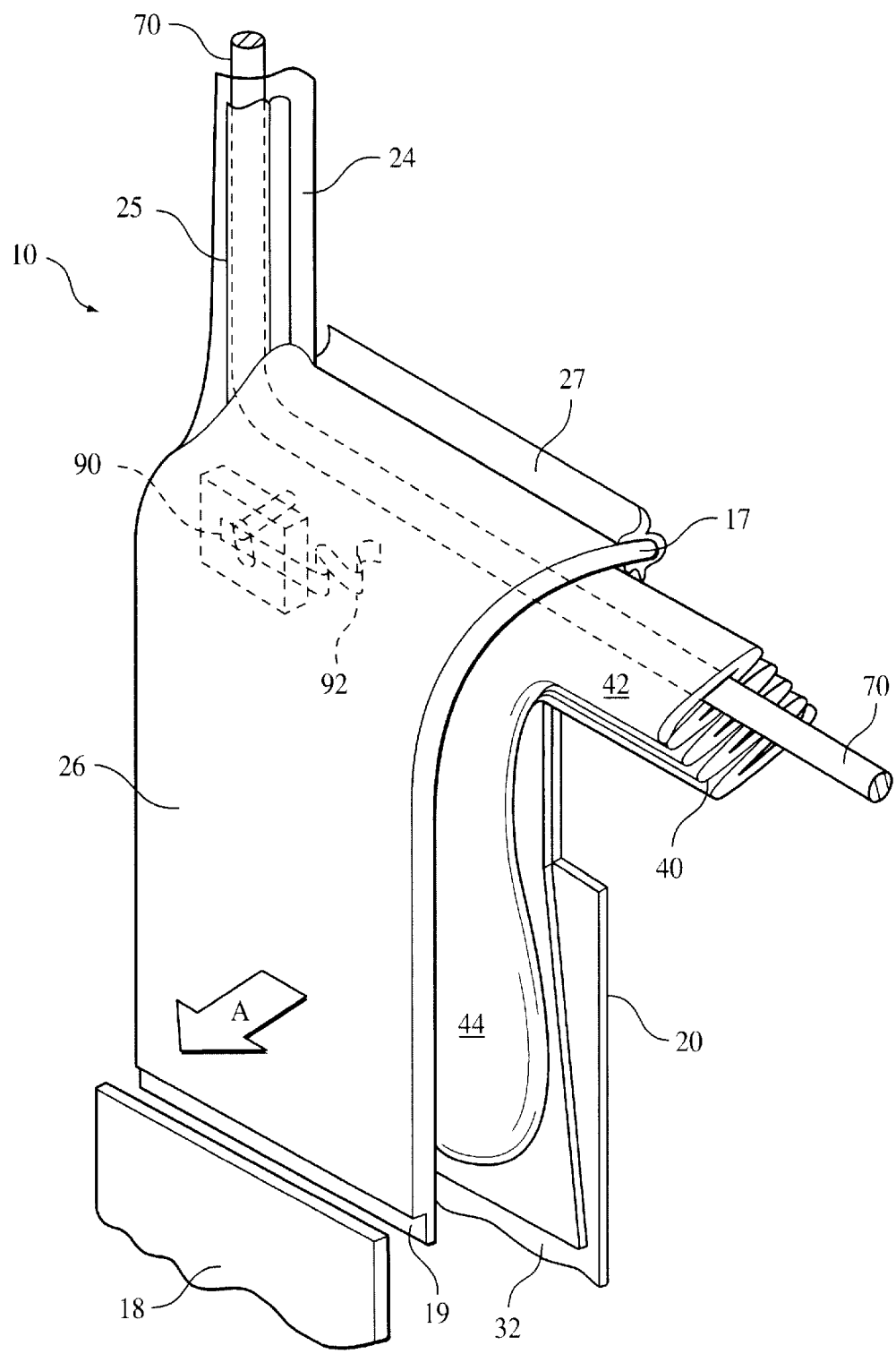
FIG. 2 is a perspective view of an exemplary embodiment of the door mounted side restraint in an un-deployed state.
Figure 3:
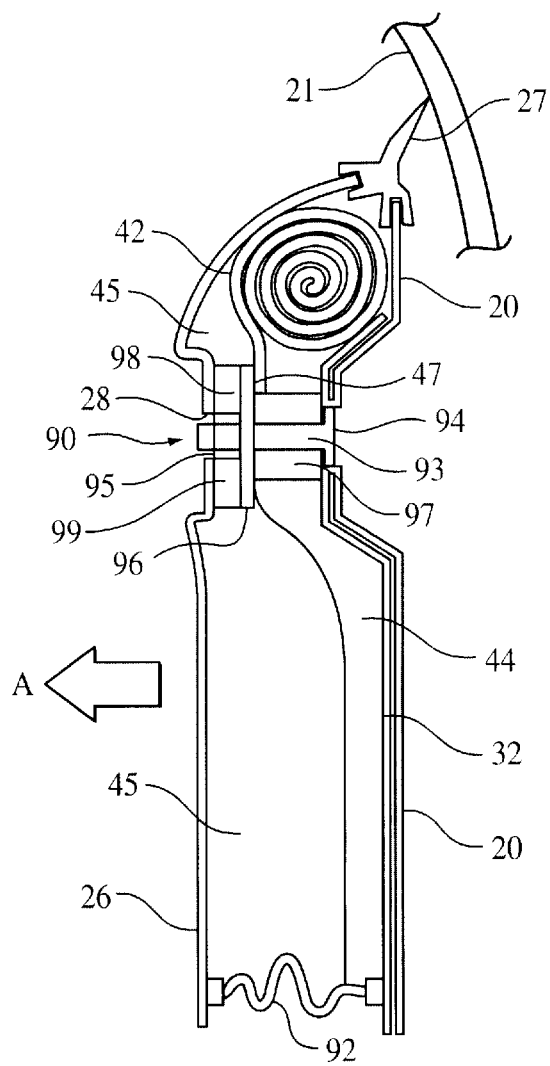
FIG. 3 is a cross sectional view of the door mounted side restraint in an un-deployed state.
Figure 4:
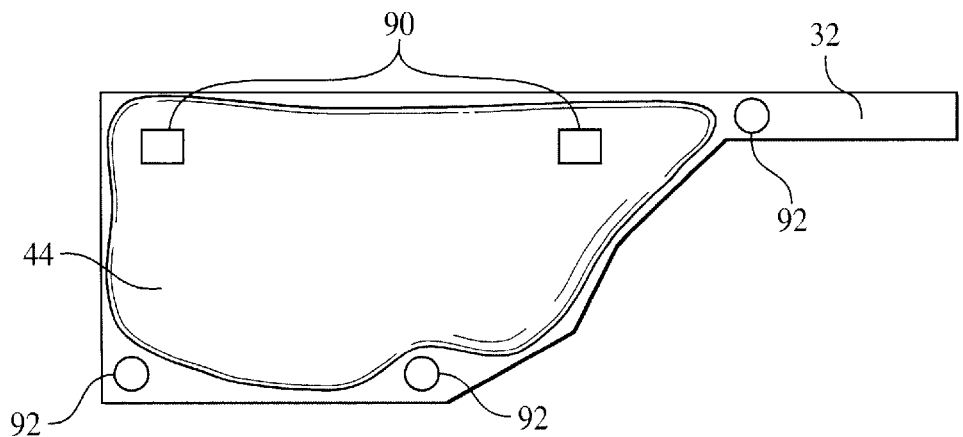
FIG. 4 is a partial front view of the door mounted side restraint of FIG. 3.
Figure 5:
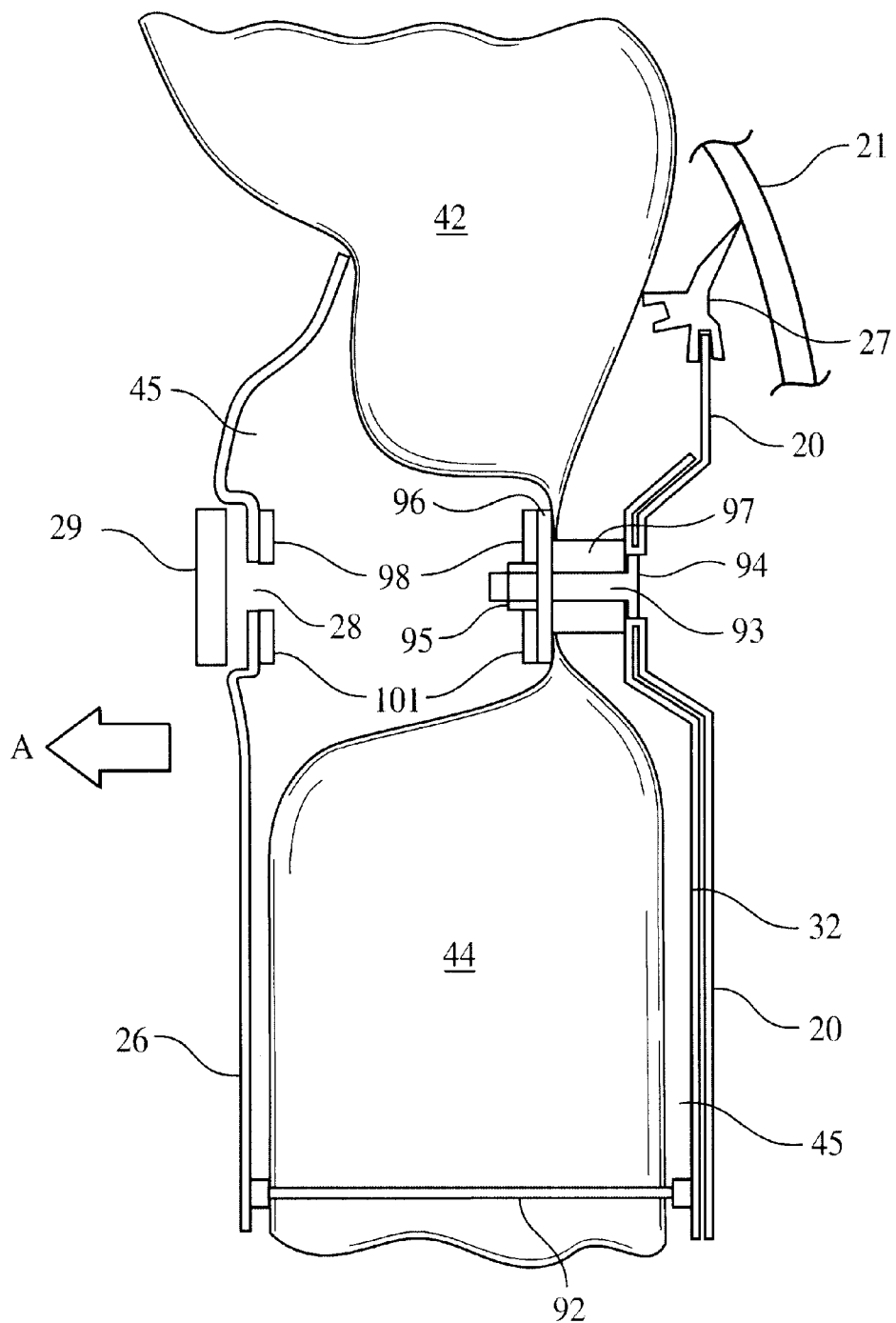
FIG. 5 is a cross sectional view of the deployed door mounted side restraint of FIG. 1.

A partial view of side restraint system 10 in a stored or undeployed state is provided in FIGS. 2 through 4 and in a deployed state in FIG. 5. Pivot connection 71 of strap 70 is removably secured to vertical portion 24 of door 20 under a vertical trim strip 25. Cushion 40 and strap 70 are stored in a cavity 45 under a trim panel 26. Strap 70 runs under trim panel 26 and up to pulley 72. Preferably, pulley 72 is secured under a side view mirror portion cover 73 at corner 23. Thus, side view mirror portion cover 73 provides a pleasing aesthetic appearance by shielding pulley 72 from view. The upper edge of trim panel 26 connects with a window molding 27.

During deployment of side restraint system 10, trim panel 26 moves inboard in the direction of arrow A to allow cushion 40 to inflate and strap 70 to deploy. Similarly, vertical trim strip 25 moves inboard to allow strap 70 to deploy. Thus, cushion 40 inflates such that lower section 44 travels inboard laterally, while upper section 42 travels inboard upwardly. Strap 70 deploys by pivoting about pivot connection 71 at corner 22, while tensioning device 80 draws up any excess slack from the strap by pulling the strap through sew-out area 49 of cushion 40 and through pulley 72 at lower front corner 23.

In one embodiment of tensioning device 80, the tensioning device is adapted to provide tension to strap 70 to remove the slack in the strap during the inflation of cushion 40. Thus, strap 70 aids in the deployment of cushion 40 by pulling the cushion into position across window 21. In an alternate embodiment of tensioning device 80, the tensioning device is adapted to provide tension to strap 70 to remove the slack in the strap after cushion 40 is inflated. Thus in this embodiment, inflation of cushion 40 deploys strap 70 by pulling the strap into position across window 21.

Shown in FIG. 3, trim panel 26 includes a plurality of breakaway fasteners 90 connected to a base plate 32 of air bag module 30. Base plate 32 is mounted to the inner sheet metal of door 20. Thus, a cavity 45 for cushion 40 is defined between trim panel 26 and base plate 32. In a preferred embodiment, fastener 90 includes a tether 92 to prevent trim panel 26 from totally separating from door 20 during the deployment of system 10. Thus, tether 92 is adapted to allow trim panel 26 to move inboard in the direction of arrow A without completely detaching from base plate 32. In the embodiment of FIG. 2, tether 92 is integral with fastener 90. In the embodiment of FIGS. 3 and 4, tether 92 is remote from fastener 90. Tether 92 is preferably a fabric strap or a sheet metal strap in a folded position.

In another embodiment of fastener 90 also illustrated in FIG. 2, trim panel 26 includes the fasteners along an upper portion 17 of the trim panel and includes a bottom trim section 18 that overlaps a bottom edge 19 of the trim panel. Bottom trim section 18 prevents bottom edge 19 of trim panel 26 from moving away from door 20 while fasteners 90 allow upper portion 17 to move away from the door. Thus, trim panel 26 pivots during deployment of system 10. Namely, upper portion 17 of trim panel 26 moves inboard in the direction of arrow A and bottom edge 19 remains under bottom trim section 18. Moreover, bottom trim section 18 provides a covering feature to bottom edge 19 of trim panel 26 to conceal rough edges, if any, of the bottom edge.

Cushion 40 is also attached to base plate 32 of air bag module 30. By way of example, cushion 40 is depicted attached to base plate 32 by fastener 90. Cushion 40 includes holes 47 proximate fasteners 90 through which the fastener passes. Holes 47 include, for example, reinforced sew-out areas, collared areas, or grommet areas. In the embodiment of fastener 90 in FIGS. 3 and 4, the fastener includes a stud 93 having a head 94 on one end and adapted to receive a nut 95 and a washer 96 on its opposite end. Stud 93 is secured through base plate 32 such that head 94 is adjacent the base plate. A collapsible foam collar 97 is placed over stud 93. Cushion 40 is placed over stud 93 such that hole 47 fits over foam collar 97. Nut 95 and washer 96 are placed over stud 93 to hold cushion 40 in place. A breakaway portion 98 is secured to washer 96 and to trim panel 26. Breakaway portion 98 is, for example, an adhesive connection 99 (FIG. 3) or a hook and loop type connection 101 (FIG. 5). In an exemplary embodiment shown in FIGS. 3 and 5, trim panel 26 includes an access hole 28, which allows access to nut 95 for assembly and maintenance purposes. For aesthetic reasons, a masking 29 preferably covers access hole 28 from view.

The inflation of cushion 40 urges trim panel 26 away from base plate 32 in the direction of arrow A as shown in FIG. 5. The urging of trim panel 26 from base plate 32 acts on breakaway portion 98 to release the trim portion from fastener 90. However, cushion 40 remains secured to base plate 32 at hole 47 as a result of stud 93, nut 95 and a washer 96. Trim portion 26 moves away from base plate 32 until tether 92 is fully extended. It should be recognized that fastener 90 has been described above by way of example only. Other fasteners 90 are considered within the scope of the present invention provided such fasteners releasably secure trim panel 26 to base plate 32. Moreover, cushion 40 has been described by way of example as being connected to base plate 32 by the same fasteners 90 that secure trim panel 26 to the base plate. It is considered within the scope of the present invention for cushion 40 to be secured to base plate 32 by means of fasteners separate from those which secure trim panel 26 to the base plate.

Figure 6:
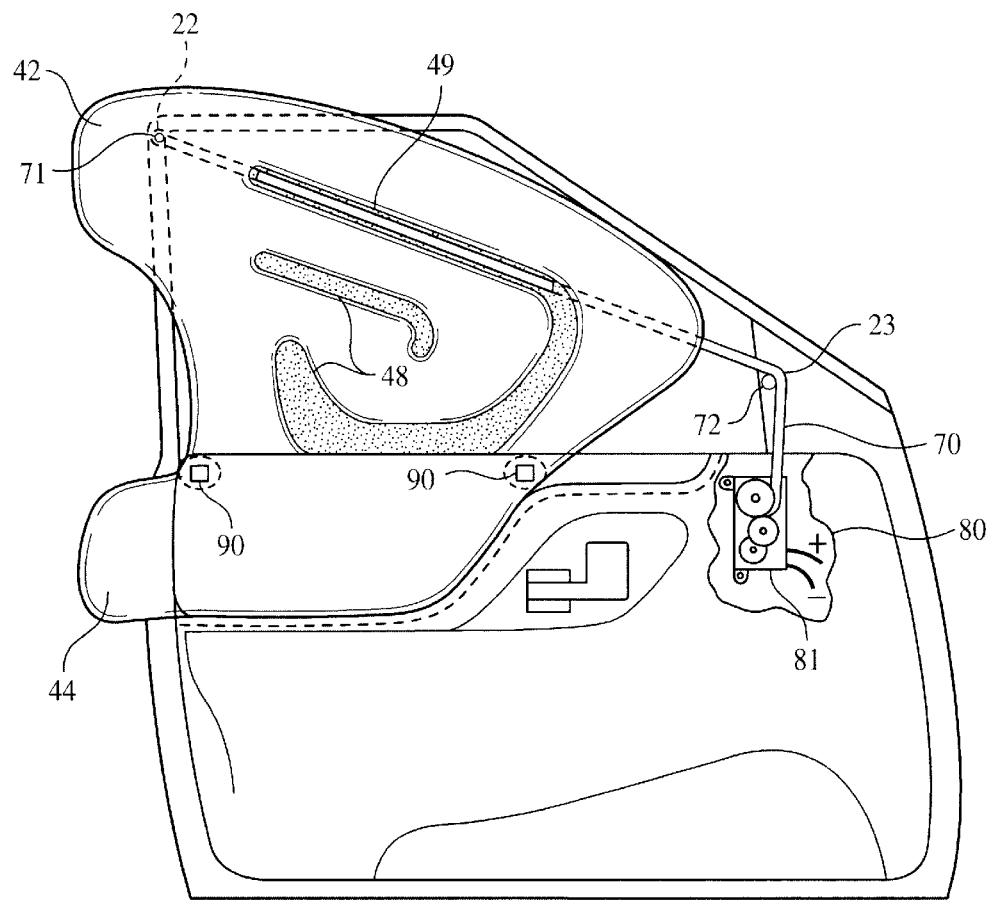
FIG. 6 is a side view of another exemplary embodiment of a door mounted side restraint in a deployed state.

Referring now to FIG. 6, an exemplary embodiment of retention mechanism 60 is illustrated. In this embodiment, tensioning device 80 includes a motor 81. As discussed above, sensing system 100 determines whether deployment of cushion 40 is necessary, and if deployment is necessary, the sensing system provides an ignition or fire signal to inflator 50. Motor 81 is operatively coupled with sensing system 100. Moreover, sensing system 100 is adapted to provide the ignition or fire signal to motor 81 to activate the motor. Upon activation of motor 81, the motor provides tension to strap 70 to remove the slack from the strap to provide cushion 40 with the tarp-like effect described above.

Figure 7:
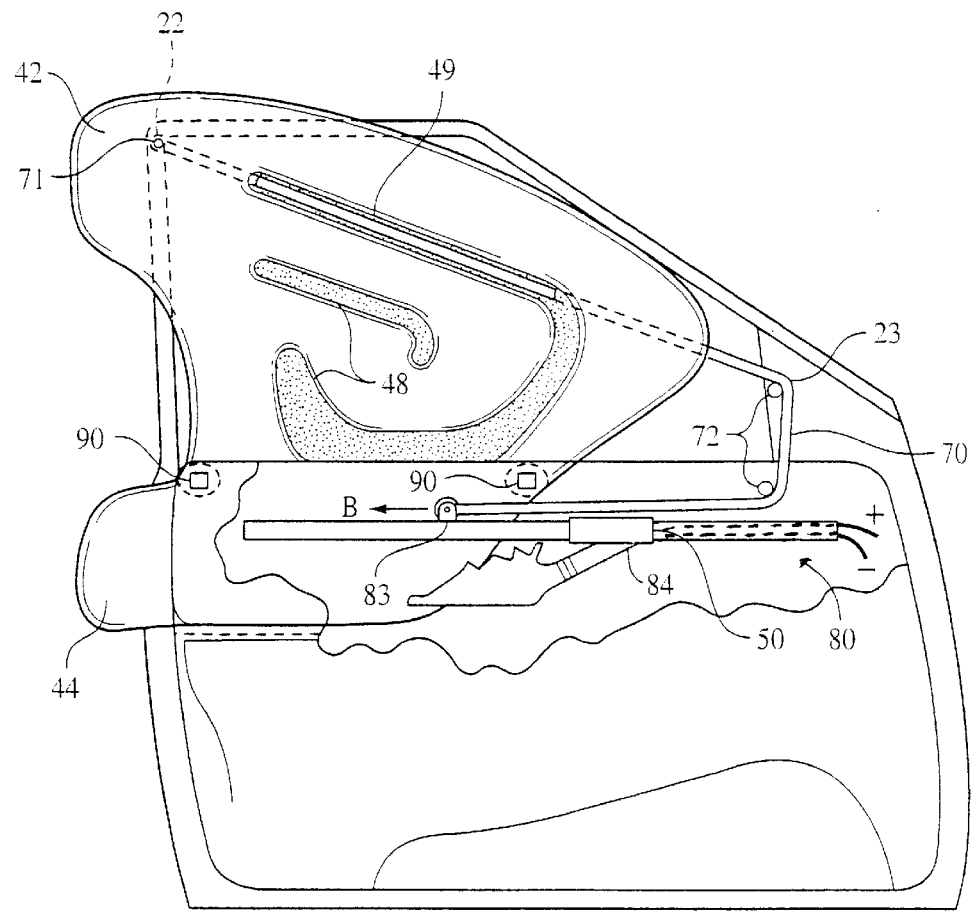
FIG. 7 is a side view of yet another exemplary embodiment of a door mounted side restraint in a deployed state.

Referring to FIG. 7, another exemplary embodiment of retention mechanism 60 is illustrated. In this embodiment, tensioning device 80 includes an inflator-activated piston 83. Inflator 50 described above with respect to the inflation of cushion 40 also drives piston 83. Thus, when sensing system 100 provides the ignition or fire signal to inflator 50, the inflator both inflates cushion 40 and drives piston 83. Inflation gas from inflator 50 is diverted through a diverter 84 to both cushion 40 and piston 83. Strap 70 is routed under trim panel 26 from pulley 72 at corner 23 to a second pulley 72, and then to piston 83. The gas from inflator 50 drives piston 83, and thus strap 70, in the direction of arrow B. Accordingly, piston 83 removes the slack from strap 70 to provide cushion 40 with the tarp-like effect described above. By way of example, piston 83 is similar to the system described in U.S. application Ser. No. 60/252844 filed on Nov. 22, 2000 and bearing attorney file number DP303370.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A door mounted side restraint system, comprising:

a base plate connectable to said door;

a trim panel connected to said base plate by one or more fasteners;

a cavity formed between said base plate and said trim panel;

an air bag module including an inflatable cushion and an inflator in fluid communication with said inflatable cushion, said air bag module being stored in said cavity, said inflatable cushion being connected to said base plate in a non-breakaway manner by said one or more fasteners, said inflator being activatable to inflate said inflatable cushion to cause said one or more fasteners to release said trim panel from said base plate while retaining said inflatable cushion to said base plate; and a retention mechanism including a retention strap and a tensioning device, said retention strap being connected to said inflatable cushion and being deployable across a window frame of a vehicle such that said retention strap assists in suspending said inflatable cushion about said window frame.

2. The door mounted side restraint system of claim 1, wherein said tensioning device provides tension to said retention strap to tighten said retention strap during inflation of said inflatable cushion such that said retention strap pulls said cushion to a deployed position across said window frame.

3. The door mounted side restraint system of claim 1, wherein said tensioning device provides tension to said retention strap to remove slack from said retention strap after said inflatable cushion is inflated such that said inflatable cushion pulls said retention strap to a deployed position across said window frame.

4. The door mounted side restraint system of claim 1, wherein said tensioning device is a motor.

5. The door mounted side restraint system of claim 1, wherein said tensioning device is a piston actuatable by said inflator.

6. The door mounted side restraint system of claim 1, further comprising a reinforcing sew-out area of said inflatable cushion for slidably associating said retention strap and said inflatable cushion.

7. A door mounted air bag module, comprising:

a base plate connectable to a door of a vehicle;

a trim panel connected to said base plate by one or more breakaway fasteners;

a cavity formed between said base plate and said trim panel;

an inflatable cushion stored in said cavity; and an inflator in fluid communication with said inflatable cushion, said inflator being activatable to inflate said inflatable cushion upon receipt of an ignition signal and said one or more breakaway fasteners being releasable by inflation of said inflatable cushion such that said trim panel moves away from said base plate, wherein said one or more breakaway fasteners connect said inflatable cushion to said base plate in a non-breakaway manner.

8. The door mounted air bag module of claim 7, further comprising a retention mechanism for maintaining at least a portion of said inflatable cushion in a deployed state across a window of said vehicle to provide a tension to said inflatable cushion, said retention mechanism being stored in said cavity.

9. The door mounted air bag module of claim 8, wherein said retention mechanism further comprises:
    a retention strap slidably connected through said inflatable cushion, said retention strap being connectable to said vehicle between an upper rear corner and a lower front corner of said window; and
    a tensioning device for taking up slack in said retention strap.

10. The door mounted air bag module of claim 7, wherein said inflatable cushion has a predetermined shape comprising an upper inflatable section and a lower inflatable section, said upper inflatable section and said lower inflatable section defining a recessed portion when said inflatable cushion is inflated.

11. The door mounted air bag module of claim 7, wherein said one or more breakaway fasteners comprise:
    a stud having a first end and a second, said first end having a head and said second end having a thread for receiving a nut, said stud is secured through said base plate such that said head is adjacent said base plate;
    a collar placeable over said stud secured through said base plate, said inflatable cushion includes a hole that is placeable over said stud such that said hole fits over said collar;
    a washer placeable over said second end to hold said cushion in place on said collar when said nut is threadably received on said second end; and
    a breakaway portion secured to said washer and to said trim panel, said breakaway portion being releasable by inflation of said inflatable cushion such that said trim panel moves away from said base plate and said inflatable cushion remains secured on said stud.

12. The door mounted air bag module of claim 11, wherein said breakaway portion is selected from the group consisting of a breakaway adhesive connection and a hook and loop connection.

13. The door mounted air bag module of claim 7, further comprising one or more tethers connected to said base plate and said trim panel such that upon inflation of said inflatable cushion said trim panel moves away from said base plate but is extendably retained to said base plate by said tethers.

14. A side restraint system for use in a vehicle, comprising:
    an air bag module including an inflatable cushion and an inflator, said inflatable cushion being secured to a base plate by a plurality of fasteners, said inflator being disposed in fluid communication with said inflatable cushion, said base plate being connectable to a door of the vehicle;
    a trim panel being connected to said base plate by said plurality of fasteners; and
    a cavity defined by said base plate and said trim panel, said cavity being sufficient to store said inflatable cushion in a non-inflated state, said inflator being activatable to inflate said inflatable cushion to cause said plurality of fasteners to release said trim panel from said base plate such that said inflatable cushion expands from said cavity, while said plurality of fasteners maintain said inflatable cushion retained to said base plate.

15. The side restraint system as in claim 14, further comprising a retention mechanism for maintaining at least a portion of said inflatable cushion in a deployed state across an opening of said door, said retention mechanism being configured for storage in said cavity.

16. The side restraint system as in claim 15, wherein said retention mechanism comprises:
    a retention strap being connected to said inflatable cushion and being deployable by a tensioning device across said opening such that a tension is provided to said inflatable cushion by said retention strap.

17. The side restraint system as in claim 14, wherein said inflatable cushion has a predetermined shape when said inflatable cushion is inflated, said predetermined shape comprising an upper inflatable section, a lower inflatable section, and a recessed portion defined by said upper and lower inflatable sections.

18. The side restraint system as in claim 14, wherein each of said plurality of said fasteners comprises:
    a first portion not being releasable by inflation of said inflatable cushion such that said inflatable cushion remains retained to said base plate; and
    a second portion being releasable by inflation of said inflatable cushion such that said trim panel moves away from said base plate.

19. The side restraint system as in claim 18, wherein said first portion comprises:
    a stud extending from said base plate;
    a collar disposed over said stud, said collar being configured for receipt in a hole of said inflatable cushion; and
    means for retaining said inflatable cushion on said collar.

20. The side restraint system as in claim 19, wherein said second portion comprises:
    a breakaway portion releasably securing said trim panel to said first portion, said breakaway portion being releasable by inflation of said inflatable cushion such that said trim panel moves away from said base plate.

21. The side restraint system as in claim 20, wherein said breakaway portion is selected from the group consisting of an adhesive connection and a hook and loop connection.

22. The side restraint system as in claim 14, further comprising one or more tethers connecting said base plate and said trim panel such that upon inflation of said inflatable cushion said trim panel moves away from said base plate but is extendably retained to said base plate by said tethers.

23. The side restraint system as in claim 22, wherein said one or more tethers are integral with or remote from said plurality of fasteners.

* * * * *